US012673240B2

(12) United States Patent
Wei et al.

(10) Patent No.: US 12,673,240 B2
(45) Date of Patent: Jul. 7, 2026

(54) SMART SWIMMING GOGGLES

(71) Applicant: HANGZHOU GUANGLI TECHNOLOGY CO., LTD., Hangzhou (CN)

(72) Inventors: Yizhen Wei, Hangzhou (CN); Zhipeng Wu, Hangzhou (CN); Zhuopeng Zhang, Hangzhou (CN)

(73) Assignee: HANGZHOU GUANGLI TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/881,254

(22) PCT Filed: Sep. 4, 2024

(86) PCT No.: PCT/CN2024/116823
§ 371 (c)(1),
(2) Date: Jan. 3, 2025

(87) PCT Pub. No.: WO2025/008009
PCT Pub. Date: Jan. 9, 2025

(65) Prior Publication Data
US 2026/0000938 A1     Jan. 1, 2026

(30) Foreign Application Priority Data
Jul. 4, 2023     (CN) .......................... 202321723501.3

(51) Int. Cl.
*A63B 33/00*     (2006.01)
*G02B 27/01*     (2006.01)
(52) U.S. Cl.
CPC ........ *A63B 33/002* (2013.01); *G02B 27/0172* (2013.01); *G02B 27/0176* (2013.01)

(58) Field of Classification Search
CPC .............. A63B 33/022; G02B 27/0172; G02B 27/0176
See application file for complete search history.

(56) References Cited

U.S. PATENT DOCUMENTS

2017/0333752 A1     11/2017     Korkala
2021/0154558 A1     5/2021     Travers

FOREIGN PATENT DOCUMENTS

CN     205145530 U     4/2016
CN     208580278 U     3/2019
(Continued)

OTHER PUBLICATIONS

ISR for PCT/CN2024/116823 mailed Nov. 13, 2024.

*Primary Examiner* — Stacy Khoo
(74) *Attorney, Agent, or Firm* — The Sun IP Law

(57)     ABSTRACT

The disclosure provides smart swimming goggles, including a swimming goggle eyecup, a housing attached to the swimming goggle eyecup and internally provided with a closed cavity, and a near-eye display system arranged in the closed cavity of the housing; the near-eye display system includes a light source device, an optical assembly at least including a waveguide lens, a processor, and a wireless communication module; an area, right facing the waveguide lens, of the housing is a light-transmitting area; the optical assembly is configured to transmit projection light outputted by the light source device to a human eye through the waveguide lens; the processor is in communication connection with an external terminal device through the wireless communication module, so that information interaction between the processor and the external terminal device is facilitated; and the housing is further provided with a waterproof key.

19 Claims, 8 Drawing Sheets

(56)        References Cited

FOREIGN PATENT DOCUMENTS

| CN | 211536414 U | 9/2020 |
| CN | 213432868 U | 6/2021 |
| CN | 213667800 U | 7/2021 |
| CN | 215375955 U | 12/2021 |
| CN | 215781350 U | 2/2022 |
| CN | 219891489 U | 10/2023 |
| CN | 220572621 U | 3/2024 |

201    203    204    202

SMART SWIMMING GOGGLES

CROSS-REFERENCE TO RELATED APPLICATION

This application is a National Stage Filing of the PCT International Application No. PCT/CN2024/116823 filed on Sep. 4, 2024, which claims priority to Chinese Patent Application No. 202321723501.3, filed to the China National Intellectual Property Administration on Jul. 4, 2023 and entitled "Smart Swimming Goggles", the disclosure of which is hereby incorporated by reference in its entirety.

TECHNICAL FIELD

The disclosure relates to the technical field of optics, and in particular to smart swimming goggles.

BACKGROUND

With the improvement of people's living standards, more and more people are improving their physical fitness through fitness exercises, and swimming is one of the popular sports for all ages. Smart swimming goggles are commonly used sports devices in swimming events, which may help a swimmer see underwater on the basis of protecting eyes, and avoid underwater dangers to a certain extent.

However, the function of current conventional smart swimming goggles is relatively simple, which is difficult to meet the personalized requirements of the swimmer.

SUMMARY

Some embodiments of the disclosure are to provide smart swimming goggles having a near-eye display function, which may provide more swimming information data for a swimmer, improve the interestingness of the swimming process, and meet the personalized requirements of the swimmer.

An embodiment of the disclosure provides smart swimming goggles, including a swimming goggle eyecup, a housing attached to the swimming goggle eyecup and internally provided with a closed cavity, and a near-eye display system arranged in the closed cavity of the housing. The near-eye display system includes a light source device configured to output projection light, an optical assembly at least including a waveguide lens, a processor electrically attached to the light source device, and a wireless communication module in communication connection with the processor.

The optical assembly is configured to transmit the projection light outputted by the light source device to a human eye through the waveguide lens. An area, right facing the waveguide lens, of the housing is a light-transmitting area, so that the human eye is able to see the environmental scenery and a projection picture through the light-transmitting area.

The processor is in communication connection with an external terminal device through the wireless communication module, so that information interaction between the processor and the external terminal device is facilitated.

The housing is further provided with a waterproof key attached to the processor and configured to send a trigger instruction to the processor when pressed, so that the processor controls a working state of the light source device according to the trigger instruction.

In an embodiment, the waveguide lens includes a coupling-in surface, a side surface, and a coupling-out surface. The coupling-out surface is obliquely arranged relative to the side surface. The coupling-out surface is provided with a diffraction element.

The projection light output by the light source device is coupled into the waveguide lens through the coupling-in surface, is incident to the coupling-out surface after total reflection and conduction of the side surface, and is diffracted and output to the human eye through the diffraction element.

The optical assembly further includes a compensation lens attached to a side of the diffraction element away from the coupling-out surface and configured to perform distortion correction on ambient light which passes through the compensation lens, the diffraction element, and the waveguide lens sequentially.

In an embodiment, the optical assembly further includes an optical correction lens arranged on a side of the waveguide lens.

In an embodiment, a surface of the light-transmitting area of the housing close to a side of the swimming goggle eyecup is provided with a functional film. The functional film includes a substrate layer, and at least one structural layer of a reinforcing layer, an anti-fog layer, and an anti-blue light layer arranged on the substrate layer.

In an embodiment, the smart swimming goggles further include a data detector attached to the processor. The data detector include at least one of an acceleration sensor, a gyroscope, a geomagnetic sensor, a Global Positioning System (GPS), a water temperature sensor, a water pressure sensor, a heart rate meter, and an oximeter.

The processor is configured to obtain detection data measured by the data detector, perform projection display on the detection data through the light source device, and upload the detection data to the external terminal device.

In an embodiment, the light source device includes an image source configured to output the projection light. The optical assembly further includes an optical prism arranged on an output light path of the light source device and configured to refract and input the projection light output by the image source into the coupling-in surface.

The near-eye display system further includes an integrated frame having two mounting plates arranged in parallel; the integrated frame is clamped to an inner wall of the housing.

The image source is mounted on a side of the two mounting plates, and a coupling-in end of the waveguide lens is mounted on the other side of the two mounting plates. The optical prism is mounted between the two mounting plates and is located between the image source and the coupling-in end of the waveguide lens.

The two mounting plates are respectively snap-fitted with the optical prism and the coupling-in end of the waveguide lens through a snap-fit structure.

In an embodiment, the housing is provided with a key through hole.

The waterproof key includes a key column penetrating through the key through hole, a key bracket arranged on an inner side of the housing and elastically attached to the key column, and a circuit board arranged on a side of the key bracket away from the housing. A position, right facing the key column, of the circuit board is provided with a key sensor.

The key bracket and an area around the key through hole on an inner wall of the housing are hermetically connected, so that the key bracket seals and covers an area where the key through hole is located.

In an embodiment, the smart swimming goggles further include a key cover attached to an end of the key column away from the key bracket. A length dimension and a width dimension of the key cover are both greater than a diameter of the key column.

In an embodiment, the light source device has a first projection mode and a second projection mode, and the light source device is inverted vertically according to the projection picture formed by the projection light output in the first projection mode and the projection picture formed by the projection light output in the second projection mode.

The smart swimming goggles include a first wearing mode and a second wearing mode. The waveguide lens when the smart swimming goggles are worn in the first wearing mode has a rotation of 180 degrees relative to the waveguide lens when the smart swimming goggles are worn in the second wearing mode.

When the smart swimming goggles are worn in the first wearing mode, the light source device outputs the projection light in the first projection mode. When the smart swimming goggles are worn in the second wearing mode, the light source device outputs the projection light in the second projection mode.

In an embodiment, the light source device includes an image source attached to the processor. The processor is configured to control the vertically inverted switching of the projection picture output by the image source.

In an embodiment, the housing has a mounting portion, the mounting portion is matched with a side buckle structure to connect a headstrap with the housing, and the side buckle structure includes a first connecting piece and a second connecting piece which are fixed to each other, so that the side buckle structure is attached to the housing, and at least one threading hole for connecting the headstrap is formed between the first connecting piece and the second connecting piece.

In an embodiment, the side buckle structure further includes a fixing piece and a clamping assembly.

The fixing piece is able to fix the first connecting piece to the second connecting piece.

The first connecting piece and the second connecting piece may be clamped by the clamping assembly.

The first connecting piece and the second connecting piece are pre-fixed by the clamping assembly, and then the first connecting piece is fixed to the second connecting piece by the fixing piece.

The clamping assembly includes a clamping block and a clamping groove matched with the clamping block. One of the clamping block and the clamping groove is arranged on the first connecting piece, and the other is arranged on the second connecting piece.

The smart swimming goggles provided by the disclosure include the swimming goggle eyecup, the housing attached to the swimming goggle eyecup and internally provided with the closed cavity, and the near-eye display system arranged in the closed cavity of the housing. The near-eye display system includes the light source device configured to output the projection light, the optical assembly at least including the waveguide lens, the processor electrically attached to the light source device, and the wireless communication module in communication connection with the processor. The optical assembly is configured to transmit the projection light outputted by the light source device to the human eye through the waveguide lens. The area, right facing the waveguide lens, of the housing is the light-transmitting area, so that the human eye is able to see the environmental scenery and the projection picture through the light-transmitting area. The processor is in communication connection with the external terminal device through the wireless communication module, so that information interaction between the processor and the external terminal device is facilitated. The housing is further provided with the waterproof key attached to the processor and configured to send the trigger instruction to the processor when pressed, so that the processor controls the working state of the light source device according to the trigger instruction.

In the smart swimming goggles provided by the disclosure, in addition to the conventional eyecup which is convenient for the swimmer to wear, the eyecup is further provided with the near-eye display system, so that during the swimming process, the swimmer may use the near-eye display system to see the projection pictures of various other data information such as swimming speed, distance, number of laps, ranking, etc., which not only facilitates the swimmer to obtain more effective information timely, but also improves the interestingness of the swimming process. On this basis, the near-eye display system may further be in communication connection with the external terminal device such as a mobile phone through the wireless communication module, so that the near-eye display system selectively displays the content of the projection display picture according to the instruction of the external terminal device. At the same time, the housing of the smart swimming goggles is further provided with the waterproof key, so as to provide convenience for the swimmer to automatically control the working states such as startup and shutdown of the near-eye display system in the smart swimming goggles. In addition, the side buckle structure that is separated from a goggle frame is further arranged, so that the goggle frame and a swimming goggle rim structure may be machined separately, which may reduce the manufacturing cost, increase the yield rate, and facilitate disassembly and assembly. When the side buckle structure is damaged during the manufacturing and use processes, the side buckle structure is conveniently and independently replaced without replacing the entire goggle frame. Based on the above discussion, the smart swimming goggles in the disclosure may provide more swimming information data for the swimmer during the swimming process and enhance the swimming interestingness, and the near-eye display system may be controlled and adjusted by the external terminal device and the waterproof key respectively, so that the projection display and the working state of the near-eye display system are richer, which is conducive to meeting various different personalized requirements of a user.

BRIEF DESCRIPTION OF THE DRAWINGS

In order to illustrate more clearly the embodiments of the disclosure or the technical solutions in the related art, the drawings used in the description of the embodiments or the related art will be briefly described below. It is apparent that the drawings described below are only some embodiments of the disclosure. Other drawings may further be obtained by those of ordinary skill in the art according to these drawings without creative efforts.

DETAILED DESCRIPTION OF THE EMBODIMENTS

Figure 1:
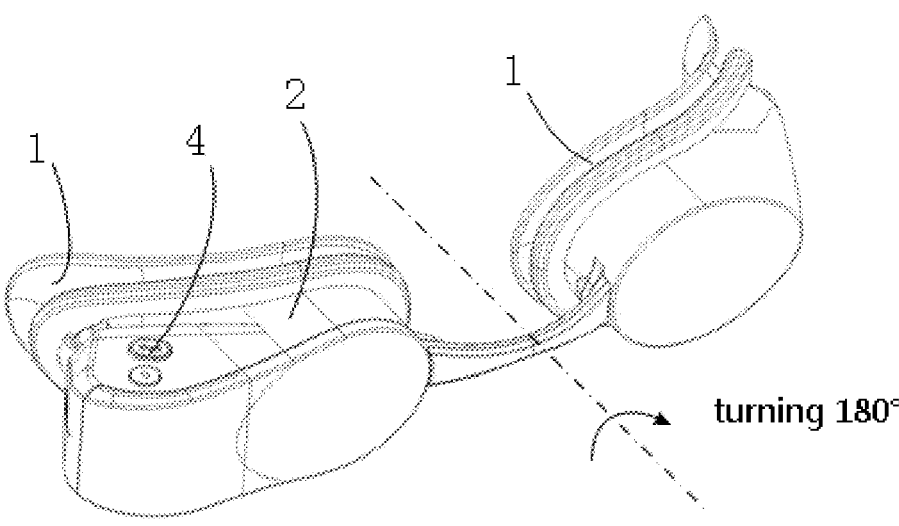
FIG. 1 is a schematic structural diagram of smart swimming goggles provided by an embodiment of the disclosure.

It is to be noted that the embodiments in the disclosure and features in the embodiments may be combined with each other without conflict. The disclosure is described in detail below with reference to the drawings and in conjunction with the embodiments.

It is to be noted that, unless otherwise defined, all technical and scientific terms used herein have the same meaning as commonly understood by those of ordinary skill in the art of the disclosure.

In the disclosure, unless otherwise specified, the orientation words used such as "up, down, top, bottom" usually refer to the directions shown in the drawings or to the component itself in an upright, vertical, or gravitational direction. Similarly, for ease of understanding and description, "inside and outside" refer to the inside and outside relative to the outline of each component itself, but the above orientation words are not intended to limit the disclosure.

The main function of current conventional swimming goggles is to protect eyes of a swimmer when the swimmer dives into the water, so that the swimmer may open the eyes to see objects in the water, and isolate the eyes from direct contact with water to prevent bacteria in the water from infecting the eyes.

However, for the swimmer, when the head frequently dives into the water during the swimming process, the senses of external vision and hearing are greatly reduced, resulting in a weaker ability of the swimmer to perceive information about the external environment. On the one hand, it is not conducive for the swimmer to adjust own various swimming action states timely, and on the other hand, it may also be difficult to detect potential dangers in the environment.

Therefore, the disclosure provides swimming goggles configured with a near-eye display system, so that the swimmer may obtain more swimming information through a picture projected by the near-eye display system during the swimming process, which improves the interestingness during the swimming process and facilitates the swimmer to discover potential dangers in the surrounding environment timely, thereby meeting more personalized requirements of the swimmer.

In order to make the solutions of the disclosure understood by those skilled in the art, the disclosure will be described below in detail in combination with the drawings and the specific implementations. It is apparent that the described embodiments are only a part of the embodiments of the disclosure, and not all of them. All other embodiments obtained by those of ordinary skill in the art on the basis of the embodiments in the disclosure without creative work shall fall within the scope of protection of the disclosure.

Figure 2:
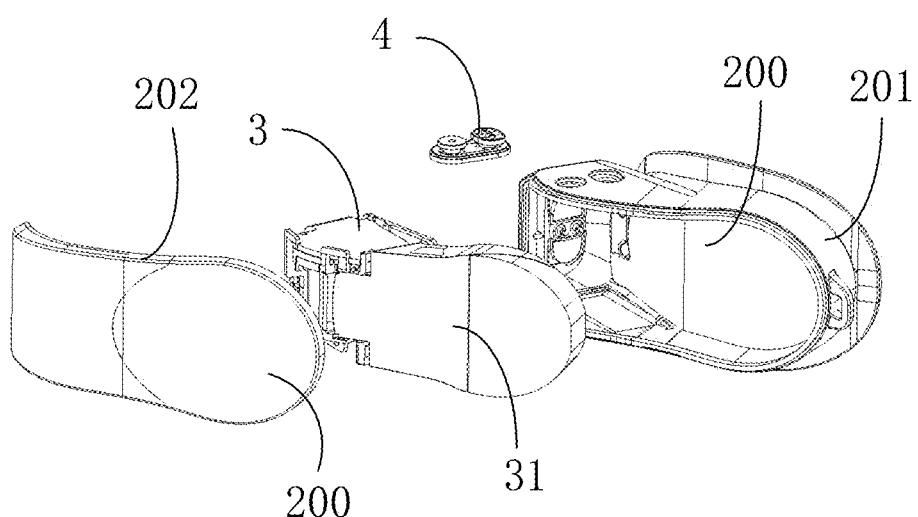
FIG. 2 is a schematic exploded structural diagram of an internal structure provided by an embodiment of the disclosure.
Figure 3:
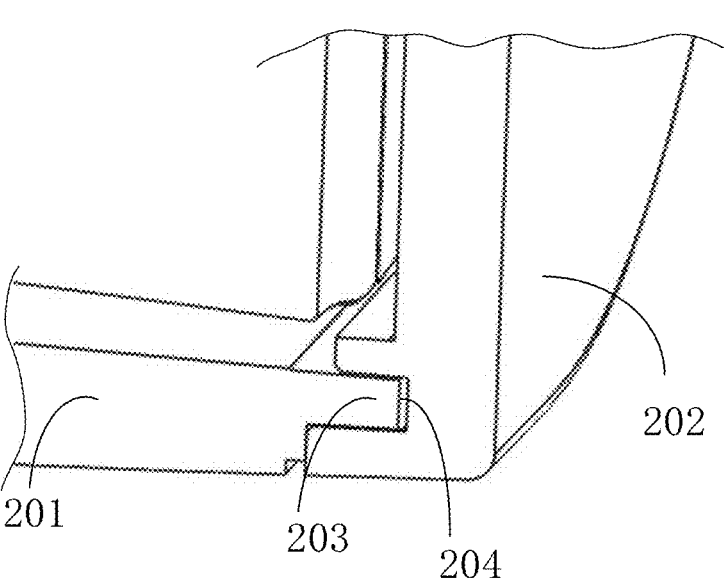
FIG. 3 is a schematic diagram of a partial structure of a housing provided by an embodiment of the disclosure.

As shown in FIG. 1 and FIG. 2, FIG. 1 is a schematic structural diagram of smart swimming goggles provided by an embodiment of the disclosure. FIG. 2 is a schematic exploded structural diagram of an internal structure provided by an embodiment of the disclosure. FIG. 3 is a schematic diagram of a partial structure of a housing provided by an embodiment of the disclosure.

In one specific embodiment of the disclosure, the smart swimming goggles include a swimming goggle eyecup 1, a housing 2, and a near-eye display system 3.

The housing 2 is attached to the swimming goggle eyecup 1 and is internally provided with a closed cavity. The near-eye display system 3 is arranged in the closed cavity of the housing 2. The near-eye display system 3 includes a light source device configured to output projection light, an optical assembly at least including a waveguide lens 31, a processor electrically attached to the light source device, and a wireless communication module in communication connection with the processor.

The optical assembly is configured to transmit the projection light outputted by the light source device to a human eye through the waveguide lens 31. An area, right facing the waveguide lens 31, of the housing 2 is a light-transmitting area 200, so that ambient light and the projection light output by the waveguide lens 31 are transmitted through the light-transmitting area 200, and then the human eye is able to see the environmental scenery and a projection picture through the light-transmitting area 200.

The processor is in communication connection with an external terminal device through the wireless communication module, so that information interaction between the processor and the external terminal device is facilitated.

The housing 2 is further provided with a waterproof key 4 attached to the processor and configured to send a trigger instruction to the processor when pressed, so that the processor controls a working state of the light source device according to the trigger instruction.

As shown in FIG. 1, the swimming goggle eyecup 1 in the disclosure may use a swimming goggle eyecup structure similar to that of conventional swimming goggles, with a sealing gasket that may ensure that the smart swimming goggles are tightly attached to the eyes of the swimmer. Unlike the conventional smart swimming goggles, in the disclosure, the swimming goggle eyecup 1 is further provided with the near-eye display system 3.

It is to be noted that one swimming goggle eyecup 1 generally corresponds to one eye on each side, and of course the swimming goggle eyecups 1 corresponding to the eyes on both sides are combined to form a whole. Correspondingly, for the smart swimming goggles containing two swimming goggle eyecups 1, one near-eye display system 3 may be configured on the swimming goggle eyecup 1 on each side, or only one swimming goggle eyecup 1 may be correspondingly provided with the near-eye display system 3, which is not specifically limited in the disclosure. In the embodiment shown in FIG. 1, that is, only one of the swimming goggle eyecups 1 is provided with the near-eye display system 3, and the other swimming goggle eyecup 1 of the smart swimming goggles is only provided with an ordinary light-transmitting cover. In addition, in the embodiment in which the two swimming goggle eyecups 1 on the smart swimming goggles are combined into one, only one near-eye display system 3 may be used for projection display of the projection picture for both eyes of a wearer simultaneously, the near-eye display system 3 may also only provide the projection picture for the eye on one side, and a common light-transmitting sheet is arranged in a sight area of the eye on the other side, so that the eye of the swimmer on one side may receive the projection picture while the eye on the other side may view the scenery in the environment.

Regardless of whether there are one or two swimming goggle eyecups 1, and whether there are one or two corresponding near-eye display systems 3, the general structure of the near-eye display system 3 is basically the same. Specifically, the swimming goggle eyecup 1 may be provided with the housing 2 having the closed cavity, and the near-eye display system 3 is arranged in the closed cavity of the housing 2. It is to be understood that the closed cavity of the housing 2 should be of a completely sealed cavity structure, so as to completely isolate the near-eye display system 3 from the water in the environment, thereby achieving the effect of waterproof protection of the near-eye display system 3. Referring to FIG. 2 and FIG. 3, the housing 2 includes a goggle frame and a goggle cover 202. The goggle frame 201 is of a semi-closed cavity structure having an opening, and the goggle cover 202 and the goggle frame 201 may jointly form a closed cavity structure. An edge of the opening of the goggle frame 201 may be provided with a circle of sealing rib 203, and the goggle cover 202 is correspondingly provided with a circle of sealing groove 204. When the sealing rib 203 on the goggle frame 201 is inserted into the sealing groove 204 in the goggle cover 202, the goggle frame 201 and the goggle cover 202 may attached to each other. In order to ensure the tightness of the connection between the goggle frame 201 and the goggle cover 202, glue may be dispensed in the sealing groove 204, so that when the sealing rib 203 is inserted into the sealing groove 204, the sealing rib 203 and the sealing groove 204 may be bonded to each other, thereby forming a connection structure with good tightness.

Because the housing 2 also needs to allow the projection light derived from the waveguide lens 31 to be incident to the human eye, and also to allow the ambient light to be transmitted through the housing 2 and the waveguide lens 31 to be incident to the human eye, areas on the housing 2 located on both sides of the waveguide lens 31 and right facing the waveguide lens 31 should be the light-transmitting areas 200. As shown in FIG. 2, the housing 2 includes two parts of light-transmitting areas 200, one of which is the area, right facing the waveguide lens 31, of the goggle frame 201, and the other of which is the area, right facing the waveguide lens 31, of the goggle cover 202, thereby ensuring that the ambient light may be incident to the human eye through the light-transmitting area 200 on the goggle cover

202, the waveguide lens 31, and the light-transmitting area 200 on the goggle frame 201 in sequence. The projection light is output through the waveguide lens 31 and then is incident to the human eye through the light-transmitting area 200 on the goggle frame 201, so that the human eye is able to see the environmental scenery and the projection picture through the light-transmitting area 200.

In addition, the near-eye display system 3 includes not only basic assemblies such as the light source device and the optical assembly, but also the processor and the wireless communication module. The light source device is attached to the processor and outputs the projection light according to a projection display instruction of the processor.

Figure 12:
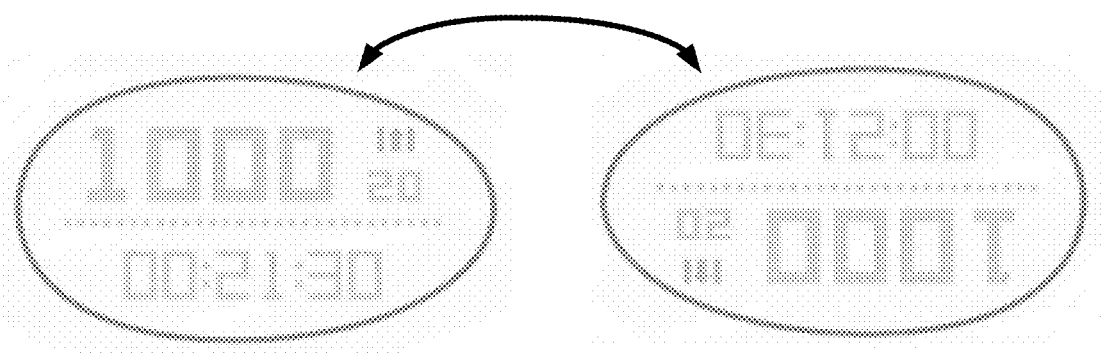
FIG. 12 is a schematic comparison diagram of a waveguide lens in two different wearing modes of smart swimming goggles provided by an embodiment of the disclosure.

As mentioned above, the processor in the embodiment may be attached to an external terminal device through the wireless communication module to achieve information interaction. The external terminal device in the embodiment may specifically be a mobile phone, a tablet computer, or a host device around a swimming pool, or a cloud platform system, which is not specifically limited in the disclosure. In practical disclosure, the projection display content of the near-eye display system 3 may be controlled through the external terminal device, for example, a control instruction may be output to the processor through the mobile phone, and the processor selectively controls the light source device for projection display of one or more of the swimming speed, swimming time, swimming mileage, calories consumed, number of turns, etc. according to the control instruction, which may be specifically selected and set by the swimmer according to the own preference. As shown in FIG. 12, FIG. 12 shows a projection picture that the human eye is able to see through the waveguide lens, where 1000 represents the swimming mileage, 00:21:30 represents the swimming time, the arrow symbol represents a turning symbol, and 20 represents the number of turns.

In an embodiment, the smart swimming goggles may be configured with various data detectors, for example, the data detectors include at least one of an acceleration sensor, a gyroscope, a geomagnetic sensor, a GPS, a water temperature sensor, a water pressure sensor, a heart rate meter, and an oximeter.

Data information detected by the various data detectors may be uploaded to the external terminal device by the processor through the wireless communication module. The external terminal device may analyze and determine a more detailed swimming state of the swimmer according to the data information. For example, the swimming speed and the swimming time may be determined through acceleration data measured by the acceleration sensor, and changes in a swimming posture of the swimmer may be determined to a certain extent through data measured by the gyroscope. Whether the swimmer dives into the water, the depth of the dive, etc. may be determined by the water pressure sensor. Heart rate data of the swimmer may be measured by the heart rate meter. The external terminal device may analyze whether the swimmer has the possibility of drowning based on the data of the water pressure sensor and the heart rate data.

It is to be understood that the detection data respectively obtained by the detection of the various data detectors on the smart swimming goggles may be directly uploaded to the external terminal device through the processor and the wireless communication module. All processing processes of the swimming data may be processed by the external terminal device without the need for the processor to perform excessive calculations, which reduces the requirements for the computing power of the processor to a certain extent.

After the external terminal device obtains information data of the current swimming state of the swimmer based on the analysis and calculation of the detection data, the information data may also be retransmitted to the processor, and the processor controls the light source device to perform projection display on the content of the information data to the swimmer. Of course, not all detection data respectively measured by the data detector needs to be analyzed and calculated by the external terminal device. For the data such as water temperature, water pressure, heart rate, etc., the processor may also directly control the light source device for projection display after the corresponding sensor transmits the data to the processor.

Based on the above discussion, the processor in the disclosure may also have certain operation capability, for example: in terms of data calculation, the processor may perform real-time storage on the detection data, and perform conventional simple operations according to the data measured by the three-dimensional acceleration sensor to determine a swimming distance and swimming pace; and in terms of controlling the display content of the light source device, the processor may achieve projection display of the light source device, such as the distance, pace, swimming posture, number of strokes, swimming efficiency Swolf, heart rate, time, swimming skill rating of the swimmer, technical guidance prompt for the swimmers dangerous state warning, short message, incoming call reminding, etc., and may also display swimming teaching videos or other projection content transmitted by the external terminal device such as the mobile phone; and in addition, the processor may also interact with external terminal device for various data transmissions.

Based on the above discussion, the processor in the disclosure mainly acts as a transfer device for controlling the display content of the light source device, and sends the corresponding control instruction to the light source device according to the instruction of the external terminal device. Even if a simple data processing operation is performed, it is only a relatively conventional operation process of determining the swimming speed based on the acceleration detected by the three-dimensional acceleration sensor. It can be seen that although the processor in the disclosure also involves operations of software programs, it is apparent that the software programs that may be implemented are easily implemented based on the related art, do not involve improvements in computer programs, and do not belong to the improvement points in the disclosure. The key in the disclosure is to connect the processor with this function with other components in the near-eye display system 3 to achieve the process of diversified control of the projection display content of the near-eye display system 3, thereby meeting the protection object of the disclosure In addition, the embodiment further considers that the swimmer obviously cannot autonomously control and adjust the projection display in the near-eye display system 3 through the external terminal device during the swimming process. For this reason, the embodiment further provides the waterproof key 4 on the housing 2, so that the swimmer may also use the waterproof key 4 to send the control instruction to the processor during the swimming process, such as controlling the light source device in the near-eye display system 3 to turn on or off, or controlling the light source device to only display one or more of various data information such as the swimming speed, swimming time, and swimming distance. For example, the waterproof key 4 may be configured for each type of data information. When the data information needs to be displayed, the corresponding waterproof key 4 is pressed, and when the data information does not need to be displayed, the waterproof key 4 may be pressed again.

In summary, the smart swimming goggles provided in the disclosure are configured with the near-eye display system, which may perform projection display on various swimming data for the swimmer during the swimming process. On this basis, the processor in the near-eye display system may be attached to the external terminal device through the wireless communication module, which may not only perform information interaction with the external terminal device, but also control the projection display process of the near-eye display system according to the instruction of the external terminal device, so that the projection display picture is more flexible and richer. The processor is also attached to the waterproof key, which facilitates the swimmer to control and adjust the content displayed by the near-eye display system during the swimming process, provides convenience for the use of the swimmer, and is conducive to meeting the various personalized requirements of the swimmer.

The smart swimming goggles in the disclosure are further described below with specific embodiments.

Figure 4:
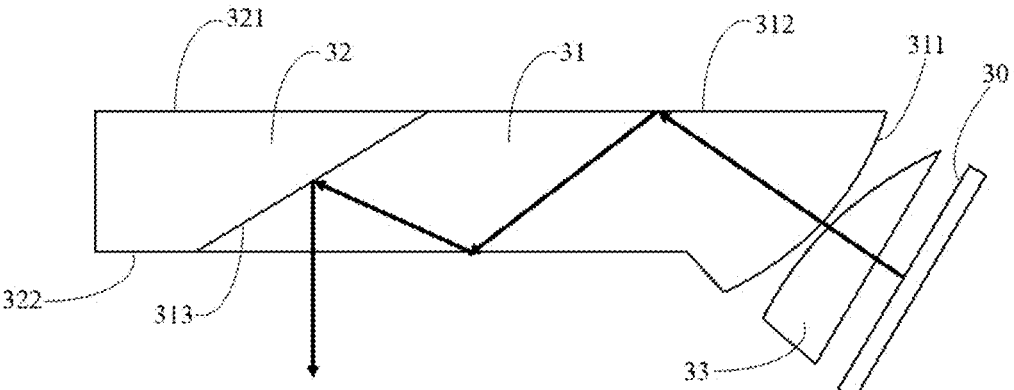
FIG. 4 is a schematic structural diagram of an optical assembly provided by an embodiment of the disclosure.

As shown in FIG. 4, in one specific embodiment of the disclosure, in the near-eye display system 3, the waveguide lens 31 contained in the optical assembly includes a coupling-in surface 311, a side surface 312, and a coupling-out surface 313.

The coupling-out surface 313 is obliquely arranged relative to the side surface 312. The coupling-out surface 313 is provided with a diffraction element.

The projection light output by the light source device is coupled into the waveguide lens 31 through the coupling-in surface 311, is incident to the coupling-out surface 313 after total reflection and conduction of the side surface 312, and is diffracted and output to the human eye through the diffraction element.

The optical assembly further includes a compensation lens 32 attached to a side of the diffraction element away from the coupling-out surface 313 and configured to perform distortion correction on the ambient light which passes through the compensation lens 32, the diffraction element, and the waveguide lens 31 in sequence.

As shown in FIG. 4, in the conventional waveguide lens 31, in order to couple the projection light totally reflected in the waveguide lens 31 out of the waveguide lens 31, a coupling element, such as a coupling-out grating, is often arranged on one of the two side surfaces 312 of the waveguide lens 31, so that the projection light is diffracted and coupled out. In the disclosure, the coupling-in end of the waveguide lens 31 is provided with the coupling-out surface 313 with a certain inclination angle relative to the side surface 312, and the diffraction element is arranged on the coupling-out surface 313. The diffraction element is also a coupling-out element that may diffract the projection light totally reflected and transmitted by the waveguide lens 31. Compared with arranging the coupling-out element on the side surface 312 of the waveguide lens 31, the obliquely arranged coupling-out surface 313 in the embodiment may reduce the range of a coupling-out angle of the projection light incident to the coupling-out surface 313 to a certain extent, and the diffraction element has a smaller incident angle of the projection light under the same refractive index modulation degree, so that the projection light has higher diffraction efficiency.

In the embodiment shown in FIG. 4, the diffraction element is a grating that performs reflective diffraction on the projection light. In practical disclosure, a transmission diffraction grating may be selected based on the number of total reflections of the projection light in the waveguide lens 31 and a direction of the projection light incident to the diffraction element, which may be specifically determined based on the actual optical path design. In addition, a holographic grating may be used as the diffraction grating in the embodiment. Of course, the embodiment does not exclude the implementations using other similar gratings.

Although the obliquely arranged coupling-out surface 313 may increase the diffraction efficiency of the projection light coupled out of the waveguide lens 31 and improve the brightness of the projection picture, the thickness of the coupling-out end and the thickness of a middle section of the waveguide lens 31 may be inconsistent, thereby causing distortion of the light in the environment, and causing the swimmer to be unable to see the scenery in the environment clearly. Therefore, in the embodiment, the coupling-out end of the waveguide lens 31 is further provided with the compensation lens 32, a surface of the compensation lens 32 is attached to a lens of the diffraction element, and the shape of the surface of the compensation lens 32 attached to the diffraction element and the shape of the diffraction element should be adapted to the coupling-out surface 313 of the waveguide lens 31, thereby ensuring that the three may be tightly attached to each other in sequence. The compensation lens 32 compensates for optical paths at different positions of the coupling-out end of the waveguide lens 31, so as to ensure that the ambient light may be transmitted and output to the human eye through the waveguide lens 31 without distortion, thereby ensuring that the swimmer is able to see the clear environmental scenery.

Furthermore, considering that the swimmer wearing the smart swimming goggles may have vision problems such as myopia, hyperopia and other refractive abnormalities, and for the projection light, the structure of the optical assembly may be reasonably arranged to ensure that the projection picture is clearly imaged in the human eye. In order to ensure that the swimmer may clearly see the scenery in the environment through the smart swimming goggles, in another optional embodiment of the disclosure, the compensation lens 32 may further be provided with a vision correction function. For example, by arranging at least one of an incident surface 321 and an exit surface 322 of the compensation lens 32 as a specific curved surface, the compensation lens 32 has optical power, so as to have the function of correcting refractive abnormalities. Of course, at least one of the two side surfaces 312 of the waveguide lens 31 may also be a curved surface, so as to ensure that the ambient light transmitted through the two side surfaces 312 of the waveguide lens 31 may also be clearly imaged.

In an embodiment, the two side surfaces of the waveguide lens 31 and the incident surface 321 and the exit surface 322 of the compensation lens 32 may also be arranged as planes. In order to correct the abnormal vision of the swimmer, the optical assembly may further include an optical correction lens arranged on a side of the waveguide lens.

The optical correction lens may be arranged on the side, outputting the projection light, of the waveguide lens 31 (i.e., the side close to the human eye), and may specifically be of a lens structure with optical focal power.

In addition, the coupling-in surface 311 of the waveguide lens 31 may also be an inclined plane or a curved surface that has a certain inclination angle with the side surface 312 of the waveguide lens 31. The curved surface that has a certain inclination angle with the side surface 312 of the waveguide may be equivalent to attaching the lens to the inclined plane that has a certain inclination angle with the side surface 312 of the waveguide lens 31, one surface of the lens is a flat surface attached to the inclined plane, and the other surface thereof is a convex curved surface or a concave curved surface.

Compared with arranging an optical element such as a grating to couple the projection light into the waveguide lens 31, the projection light in the embodiment is directly refracted through the coupling-in surface 311 and incident into the waveguide lens 31, which may reduce the light loss of the projection light. In addition, for the embodiment in which the coupling-in surface 311 is a curved surface, the picture formed by the projection light may also be scaled to a certain extent, so as to expand the field of view of the projection light or correct the aberration distortion of the projection light.

Based on the above discussion, in order to improve the optical performance of the smart swimming goggles as much as possible, in another optional embodiment of the disclosure, a surface of the light-transmitting area 200 of the housing 2 close to a side of the swimming goggle eyecup 1 may further be provided with a functional film. The functional film includes a substrate layer, and at least one structural layer of a reinforcing layer, an anti-fog layer, and an anti-blue light layer arranged on the substrate layer, preferably including the anti-fog layer.

The substrate layer is a carrier, which may be an optical-grade Polyethylene Terephthalate (PET) substrate layer or a Polycarbonate (PC) substrate layer with a thickness of 0.03 mm to 0.20 mm and a light transmittance of greater than 90%. The optical-grade PET substrate layer or the PC substrate layer has excellent light transmittance, better mechanical strength, better toughness, and excellent impact resistance, which may make the functional film have sufficient toughness and strength. The substrate layer may also use other material layers, as long as other film layers are carried under the condition of meeting the requirement for light transmittance.

The reinforcing layer may be an Ultraviolet (UV) ink layer with a thickness of 0.012 mm to 0.018 mm and a hardness of 1 H to 6 H. The UV ink layer is used as the reinforcing layer after UV ink is cured by using ultraviolet light of different wavelengths and energies to polymerize monomers in an ink material under ultraviolet irradiation. The UV ink layer has good adhesion and has the characteristics of wear resistance, corrosion resistance, and weather resistance. The anti-fog layer may be a resin anti-fog layer with a thickness of 0.012 mm to 0.018 mm.

A color layer may be an anti-blue light layer with a thickness of 150 nm to 450 nm formed by Physical Vapor Deposition (PVD) vacuum coating. The anti-blue light layer may block and reflect high-energy short-wave blue light and has the function of blocking blue light. Of course, in practical disclosure, other color layers, such as a green film layer or a yellow-green film layer, may also be selected as needed.

The functional film is arranged on the surface of the light-transmitting area of the housing 2 by means of bonding.

In addition, the optical assembly in the embodiment may further include an optical prism 33 arranged between the light source device and the coupling-in end of the waveguide lens 31, so that the projection light output by the light source device is refracted and deflected by the optical prism 33 and then incident to the waveguide lens 31, thereby adapting to the mounting dimension of the internal space of the housing 2.

On this basis, in order to ensure the compactness of the structures among various optical structures in an internal cavity of the housing 2 in the disclosure, as shown in FIG. 5 to FIG. 8, in another optional embodiment of the disclosure, the light source device includes an image source 30 configured to output the projection light.

The near-eye display system 3 further includes an integrated frame having two mounting plates 341 arranged in parallel. The integrated frame is clamped to an inner wall of the housing 2.

The image source 30 is mounted on a side of the two mounting plates 341, and a coupling-in end of the waveguide lens 31 is mounted on the other side of the two mounting plates 341. The optical prism 33 is mounted between the two mounting plates 341 and is located between the image source 30 and the coupling-in end of the waveguide lens 31.

The two mounting plates 341 are respectively snap-fitted with the optical prism 33 and the coupling-in end of the waveguide lens 31 through a snap-fit structure.

Figure 5:
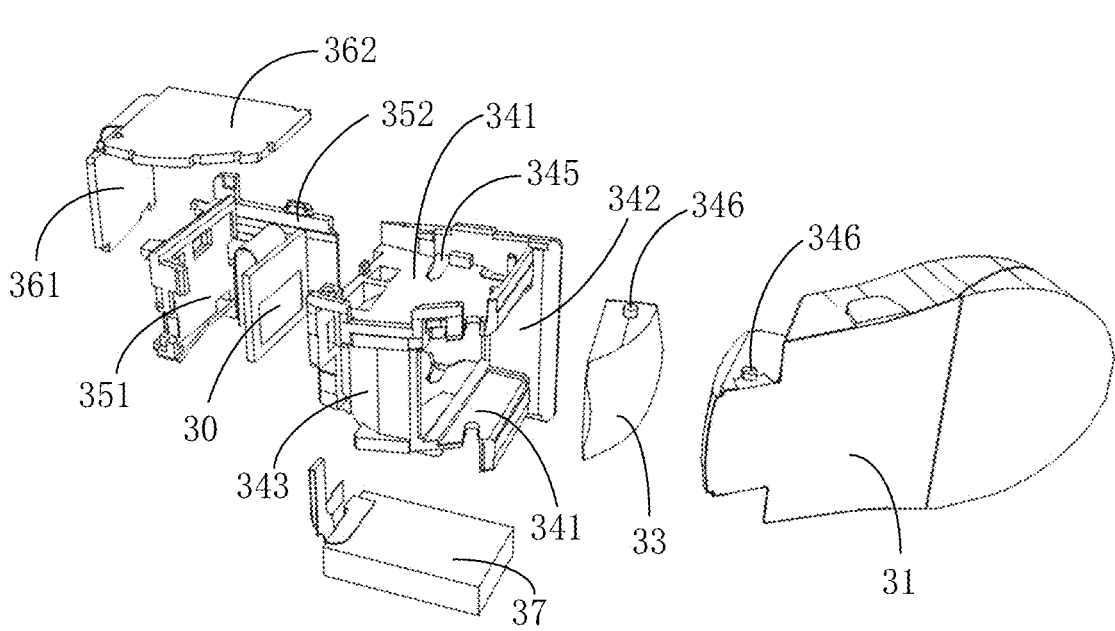
FIG. 5 is a schematic exploded structural diagram of a near-eye display system provided by an embodiment of the disclosure.
Figure 6:
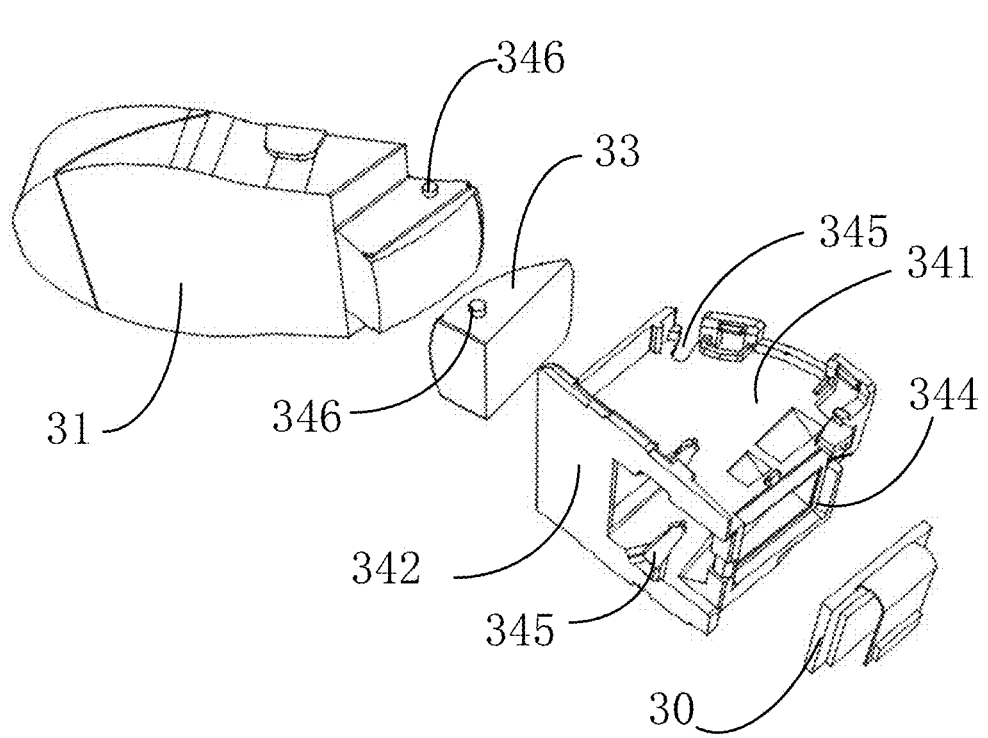
FIG. 6 is a schematic exploded structural diagram of a partial structure of a near-eye display system in FIG. 5.

Referring to FIG. 5 and FIG. 6, the integrated frame in the embodiment includes the two mounting plates 341 arranged in parallel with each other. A space for accommodating the optical prism 33 in the optical assembly is formed between the two mounting plates 341. On this basis, both sides of the two mounting plates 341 are also respectively attached to the image source 30 in the light source device and the coupling-in end of the waveguide lens 31, so as to form an integrated assembly of the image source 30, the optical prism 33, and the coupling-in end of the waveguide lens 31 in sequence, thereby ensuring the compactness of the assembly between various structural assemblies.

In the embodiment shown in FIG. 5 and FIG. 6, it is assumed that a direction on both sides of the mounting plate 341 where the image source 30 and the coupling-in end of the waveguide lens 31 are respectively arranged is a first direction, and a direction perpendicular to the first direction is a second direction. The two mounting plates 341 are respectively provided with a first side plate 342 and a second side plate 343 on both sides in the second direction. Therefore, a frame structure may be substantially formed among the first side plate 342, the second side plate 343, and the two mounting plates 341. In addition, the structures of the first side plate 342 and the second side plate 343 are not necessarily identical, and the size of the frame structure may be reduced as much as possible according to the space structure that the optical prism 33 and the coupling-in end of the waveguide lens 31 needs to occupy.

In the embodiment shown in FIG. 6, the first side plate 342 is of a planar plate structure, and the first side plate 342 is provided with a through hole, so that the optical prism 33 is inserted from the through hole into a space between the two mounting plates 341 for assembly. As shown in FIG. 5, the second side plate 343 is of a cylindrical curved structure, and the area of the second side plate 343 is relatively small, so that the first side plate 342, the second side plate 343, and the two mounting plates 341 form a larger opening at the end close to the waveguide lens 31 to facilitate the insertion of the coupling-in end of the waveguide lens 31 into the space between the two mounting plates 341. In addition, a side of the mounting plate 341 where the image source 30 is mounted is provided with a window frame 344 for fixedly mounting the image source 30, and edges of the window frame 344 are respectively attached to the two mounting plates 341, the first side plate 342, and the second side plate 343.

In order to simplify the difficulty in assembly between various components, the first side plate 342, the second side plate 343, the two mounting plates 341, and the window frame 344 of the integrated frame may be respectively snap-fitted with each other through the snap-fit structure, or the various components of the integrated frame are directly and integrally formed, thereby reducing the difficulty in structural assembly on the basis of ensuring the stability of the overall structure. In addition, the mounting plate 341 and the inner wall of the housing 2 may also be snap-fitted to reduce the difficulty in assembly of the entire near-eye display system 3.

Figure 7:
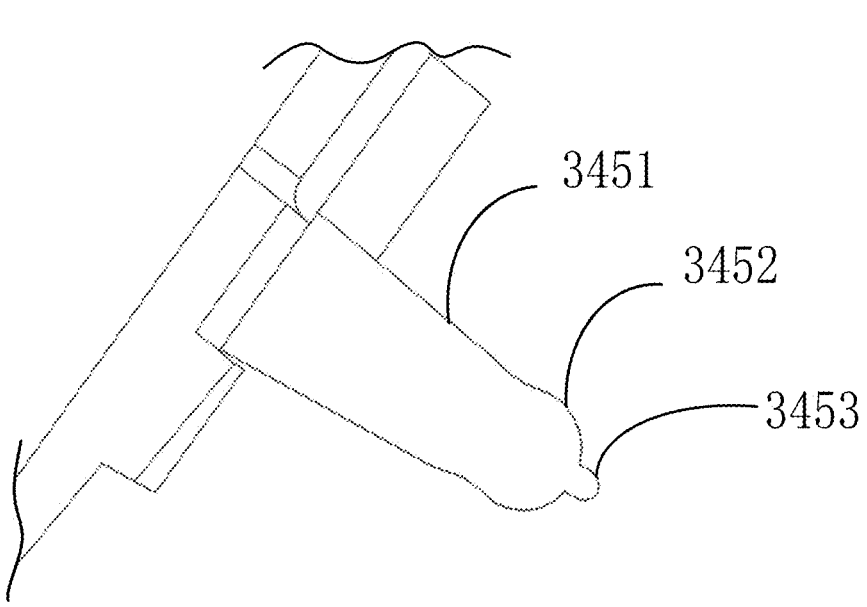
FIG. 7 is a schematic structural diagram of a clamping groove in a mounting plate in FIG. 5 and FIG. 6.
Figure 8:
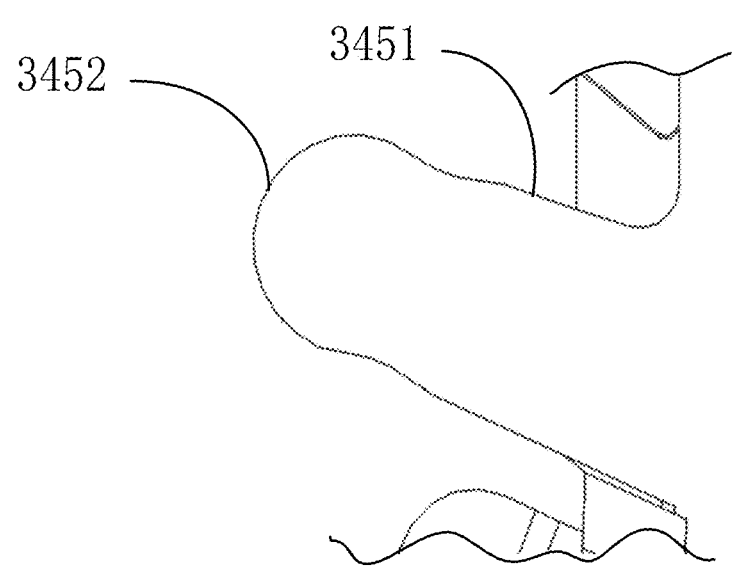
FIG. 8 is a schematic structural diagram of another clamping groove in a mounting plate in FIG. 5 and FIG. 6.

On this basis, the optical prism 33 and the coupling-in end of the waveguide lens 31 may be respectively attached to the two mounting plates 341 in a snap-fit connection manner. As shown in FIG. 7 and FIG. 8, in one optional embodiment of the disclosure, the snap-fit structure includes a camping groove 345 and a clamping column 346 which may be mutually matched and clamped.

The clamping groove 345 includes a guide groove 3451 and a positioning hole 3452. The aperture of the positioning hole 3452 is matched with the diameter of the clamping column 346. The width of an end of the guide groove 3451 close to the positioning hole 3452 is smaller than the aperture of the positioning hole 3452, and the width of the guide groove 3451 decreases from an end away from the positioning hole 3452 to the end close to the positioning hole 3452.

An edge of the positioning hole 3452 is further provided with a pressure relief groove 3453.

In the embodiment shown in FIG. 5 and FIG. 6, the optical prism 33 and the coupling-in end of the waveguide lens 31 are respectively provided with the clamping column 346, and the two mounting plates 341 are respectively provided with the clamping groove 345, one of which is snap-fitted with the clamping column 346 on the optical prism 33, and the other of which is snap-fitted with the coupling-in end of the waveguide lens 31. However, both the clamping groove 345 snap-fitted with the coupling-in end of the waveguide lens 31 and the clamping groove 345 attached to the optical prism 33 are strip-shaped clamping grooves 345 composed of the guide groove 3451 and the positioning hole 3452, one end of the guide groove 3451 is arranged at the edge of the mounting plate 341, and the other end thereof is attached to the corresponding positioning hole 3452, so as to facilitate the clamping column 346 to slide from an end of the positioning groove into the positioning hole 3452.

In addition, as shown in FIG. 7 and FIG. 8, there are two different structures of the clamping groove 345, respectively. The guide groove 3451 is gradually narrowed from an end of an opening to the end of the positioning hole 3452. The clamping column 346 is of a circular columnar structure. An opening distance of the end of the opening of the guide groove 3451 is greater than the diameter of the corresponding clamping column 346, so that the clamping column 346 smoothly enters the guide groove 3451. A distance between the positioning hole 3452 and the guide groove 3451 at a connection is slightly smaller than the diameter of the corresponding clamping column 346 to form a contraction section, so that the clamping column 346 is clamped into the positioning hole 3452 accurately through the contraction section. The clamping of the positioning hole 3452 to the clamping column 346 may effectively limit the movement of the waveguide lens 31 and the optical prism 33 in a radial direction of the positioning hole 3452. The movement of the waveguide lens 31 and the optical prism 33 in an axial direction may be effectively limited by the clamping of the two mounting plates 341. Therefore, the integrated frame may achieve the accurate positioning and fixation of the waveguide lens 31 and the optical prism 33.

As shown in FIG. 7, the positioning hole 3452 may further be provided with the pressure relief groove 3453. An end of the pressure relief groove 3453 is attached to the positioning hole 3452, and the other end thereof extends in a direction in which the guide groove 3451 is arranged. The width of the pressure relief groove 3453 is much smaller than the diameter of the positioning hole 3452. When the clamping column 346 is inserted into the positioning hole 3452, the stress around the positioning hole 3452 may be concentrated due to the deformation, and the stress concentration may cause the impact resistance of the positioning hole 3452 to deteriorate, thereby reducing the reliability. The pressure relief groove 3453 in the embodiment may eliminate the stress of the positioning hole 3452 to a certain extent, thereby effectively improving the impact resistance of the positioning hole 3452.

The above is described based on an example in which the mounting plate 341 is provided with the clamping groove 345, and the optical prism 33 and the coupling-in end of the waveguide lens 31 are provided with the clamping columns 346. However, it is to be understood that in practical disclosure, the coupling-in end of the waveguide lens 31 and the optical prism 33 may also be provided with the clamping grooves 345, and the mounting plate 341 is provided with the clamping column 346; or the waveguide lens 31 is provided with the clamping groove 345 and the clamping column 346 simultaneously, and correspondingly, a position of the mounting plate corresponding to the clamping groove 345 in the waveguide lens 31 is provided with the clamping column 346, and a position corresponding to the clamping column 346 on the waveguide lens 31 is provided with the clamping groove, etc., which may achieve the technical solution of the disclosure, and are not specifically limited in the disclosure.

It is to be noted that, although the integrated frame may assemble the light source device and the optical assembly in the near-eye display system 3, in addition, the near-eye display system 3 also needs to be configured with a circuit board 36 for mounting the processor and a power module 37. The processor, some data detectors, and a circuit for electrically connecting the processor with the image source may all be integrated on the circuit board. Therefore, as shown in FIG. 5 and FIG. 6, in practical disclosure, an outer frame may further be provided, and the outer frame includes a first connecting plate 351 and a second connecting plate 352 which are perpendicular to each other. The first connecting plate 351 is attached to a side of the integrated frame where the image source 30 is arranged, and the second connecting plate 352 is attached to the first side plate 342. In addition, edge positions of the first connecting plate 351 and the second connecting plate 352 are both provided with a plurality of clamping assemblies. Correspondingly, corresponding positions on the integrated rack are also provided with clamping structures matched with the clamping assemblies on the first connecting plate 351 and the second connecting plate 352, so as to clamp the outer frame to the integrated rack, thereby facilitating assembly and disassembly between the outer rack and the integrated rack.

As mentioned before, the first side plate 342 may be provided with a through hole which facilitates the optical prism 33 to be clamped between the two mounting plates 341. Correspondingly, in order to achieve a tight connection between the second connecting plate 352 and the first side plate 342, the second connecting plate 352 may be provided with a protruding structure protruding from a surface of a side of the second connecting plate 352 attached to the first side plate 342. The protruding structure may be clamped into the through hole in the first side plate 342 and abut against the optical prism 33, and the edge of the protruding structure may also be mutually embedded with an edge of the through hole in the first side plate 342, thereby improving the tightness between the second connecting plate 352 and the first side plate 342.

In addition, in order to improve the tightness of the connection between the outer frame and the integrated frame, a middle part of the first connecting plate 351 and/or the second connecting plate 352 may also be provided with a clamping assembly attached to the integrated frame to improve the stability of the connection between the outer frame and the integrated frame.

In addition, in the embodiment shown in FIG. 5 and FIG. 6, the circuit board 36 includes a first circuit board 361 and a second circuit board 362 which are arranged perpendicular to each other and connected by a flexible circuit. The first circuit board 361 is attached to and snap-fitted with the first connecting plate 351. The second circuit board 362 is attached to and snap-fitted with the mounting plate 341. In order to ensure the tightness of the snap-fit connections between the first circuit board 361 and the first connecting plate 351, the second circuit board 362, and the mounting plate 341, each of the snap-fit structures respectively corresponding to the first circuit board 361 and the first connecting plate 351, the second circuit board 362 and the mounting plate 341 includes a plurality of snap-fit connectors distributed at intervals. The specific structure of the snap-fit connector may be arranged based on actual needs, which is not specifically limited in the disclosure.

As mentioned above, the near-eye display system 3 is provided with the processor and the image source 30, so that the near-eye display system 3 inevitably needs to include the power module 37 for powering the light source device and the processor.

As shown in FIG. 5 and FIG. 6, the power module 37 may also be attached to the surface of one of the mounting plates 341 during actual assembly. Because the power module 37 itself may store a limited amount of quantity of electricity, the power module 37 needs to be charged. Because the power module 37 is encapsulated inside the housing 2, it is obviously inconvenient to take out the power module 37 for charging. Therefore, in another optional embodiment of the disclosure, a charging module for charging the power module 37 may also be included. The charging module may use wired charging or wireless charging.

Taking wireless charging as an example, the inner wall of the housing 2 may be attached to a charging coil electrically attached to the power module, and an outer wall of the housing 2 corresponding to a position of the charging coil is provided with a magnetic attraction piece, so that an external charging head with the charging coil may absorb the magnetic suction piece and charge through energy exchange between the charging coils.

Figure 9:
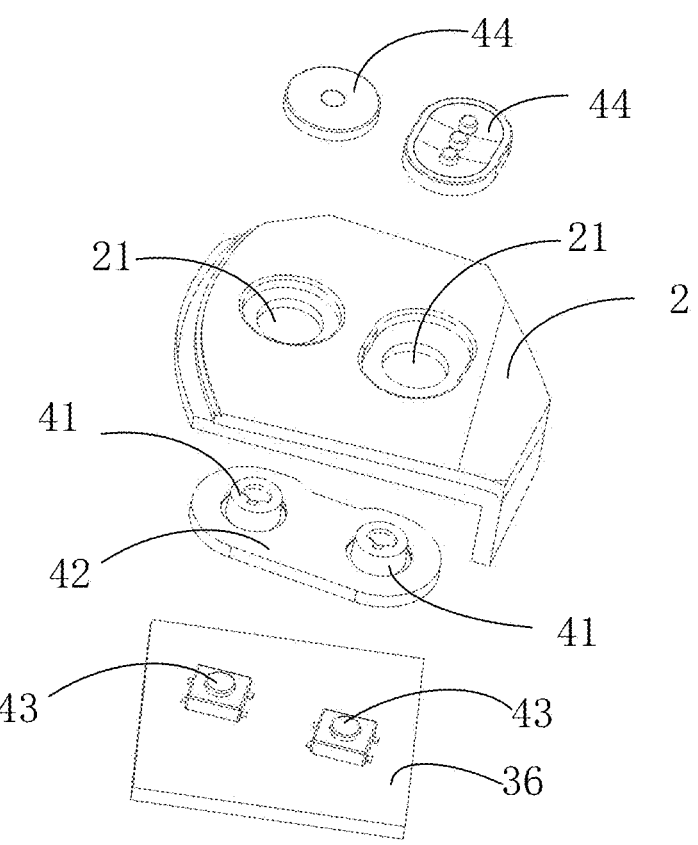
FIG. 9 is a schematic exploded structural diagram of a waterproof key provided by an embodiment of the disclosure.
Figure 10:
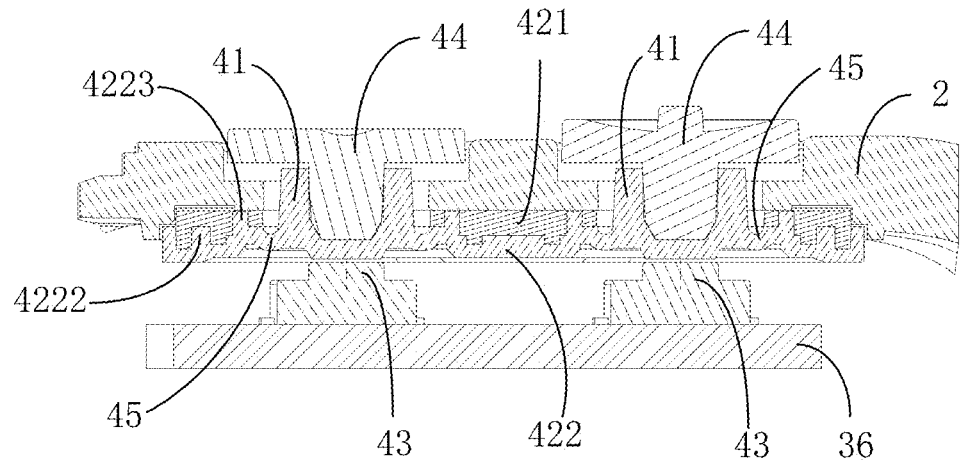
FIG. 10 is a schematic cross-sectional structural diagram of a waterproof key provided by an embodiment of the disclosure.
Figure 11:
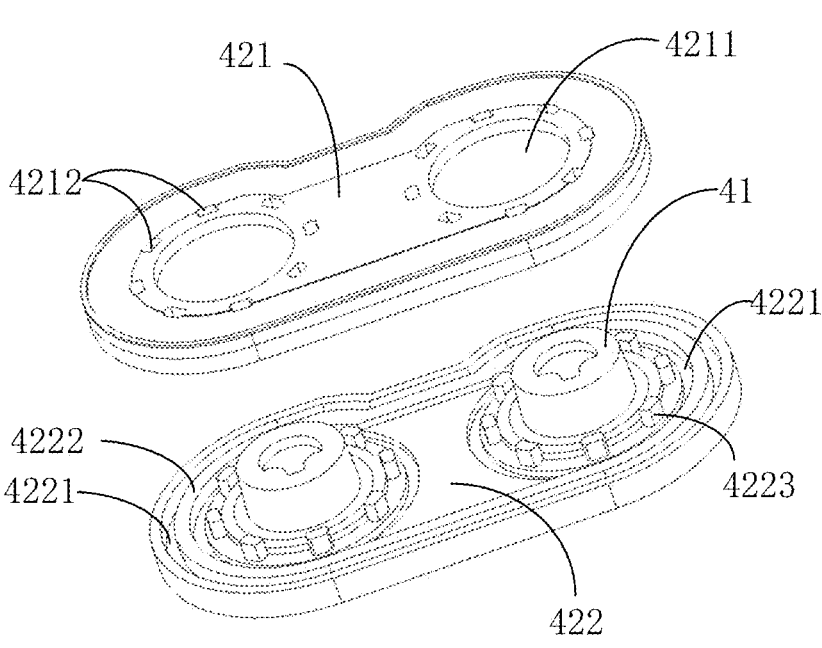
FIG. 11 is a schematic exploded structural diagram of a key bracket provided by an embodiment of the disclosure.

As mentioned above, the housing 2 of the smart swimming goggles in the disclosure may also be provided with a waterproof key 4. As shown in FIG. 9 to FIG. 11, in one optional embodiment of the disclosure, the following may further be included.

The housing 2 is provided with a key through hole 21. The waterproof key 4 includes a key column 41 penetrating through the key through hole 21, a key bracket 42 arranged on an inner side of the housing 2 and elastically attached to the key column 41, and a circuit board 36 arranged on a side of the key bracket 42 away from the housing 2. A position, right facing the key column 41, of the circuit board 36 is provided with a key sensor 43. The key bracket 42 and an area around the key through hole 21 in the inner wall of the housing 2 are hermetically connected, so that the key bracket 42 seals and covers an area where the key through hole 21 is located.

In order to arrange the waterproof key 4 in the embodiment, the housing 2 is provided with the key through hole 21, so that the key column 41 may be pressed up and down in the key through hole 21. On this basis, in order to avoid the water leakage of the key through hole 21, the inner side of the housing 2 is provided with the key bracket 42 hermetically attached to the area around the key through hole 21. In addition, the key column 41 and the key bracket 42 may be integrally formed or hermetically connected. In short, it is necessary to ensure that the key column 41 and the key bracket 42 jointly seal and cover the key through hole 21 to ensure the waterproof performance of the internal components of the housing 2.

Because the key column 41 and the key bracket 42 are elastically connected, the two may move relative to each other. When the key column 41 is pressed back and forth in a direction penetrating through the key through hole 21, the key column 41 may move back and forth relative to the key bracket 42, that is, the key column 41 abuts against the key sensor 43 on the circuit board 36 on the other side of the key bracket 42 when pressed, so that the key sensor 43 senses the pressing force to generate a corresponding trigger signal, and sends the trigger signal to the processor, and then the processor controls the light source device to work according to the trigger signal. It is to be understood that the key sensor 43 in the embodiment may be a pressure sensor, or other sensor devices that may detect that the key column 41 is pressed, which is not specifically limited in the disclosure.

In another optional embodiment of the disclosure, the key bracket 42 may further include a flexible bracket 422 and a rigid bracket 421.

The flexible bracket 422 and the rigid bracket 421 are stacked and attached.

The rigid bracket 421 is arranged between the flexible bracket 422 and the housing 2, and is attached to the inner wall of the housing 2. The rigid bracket 421 is provided with a key hole 4211 for accommodating the key column 41 to penetrate through.

The key column 41 and the flexible bracket 422 are connected through an annular rubber 45. An inner wall of the annular rubber 45 surrounds and is attached to the outer periphery of the key column 41, and an outer wall thereof is attached to the flexible bracket 422.

The key bracket 42 in the embodiment is of a structure combining the rigid bracket 421 and the flexible bracket 422. On the one hand, the rigid bracket 421 ensures the structural strength of the entire key bracket 42, and on the other hand, the ductility of the flexible bracket 422 ensures the sealing performance of the key bracket 42. As shown in FIG. 10 and FIG. 11, the rigid bracket 421 is attached to the inner wall of the housing 2, an area corresponding to the key through hole 21 is also provided with the key hole 4211, and the area around the key through hole 21 may be adhered by colloid.

In addition, the cross-sectional shape of the annular rubber 45 connecting the key column 41 with the flexible bracket 422 may be a U-shaped structure, so as to ensure that the key column 41 may move toward the inner side of the housing 2 relative to the flexible bracket 422 when pressed, and may bounce toward the outer side of the housing 2 when the key column 41 is released. Of course, the annular rubber

45 may also be a rubber ring with an S-shaped or W-shaped cross section, which is not specifically limited in the disclosure.

In an embodiment, the key column 41, the annular rubber 45, and the flexible bracket 422 may also be integrally formed, thereby further ensuring the waterproof effect of a structure jointly composed of the entire key column 41 and the key bracket 42 on the key through hole 21.

On this basis, a side of the rigid bracket 421 away from the inner wall of the housing 2 is attached to the flexible bracket 422. In order to improve the tightness of the connection between the rigid bracket 421 and the flexible bracket 422, as shown in FIG. 11, on a surface of the flexible bracket 422 attached to the rigid bracket 421, a plurality of circles of alternately distributed annular recessed grooves 4221 and waterproof raised rings 4222 may be arranged around the key hole one by one. It is to be understood that the waterproof raised ring 4222 is equivalent to a groove wall of the annular recessed groove 4221, and a circle of annular recessed groove 4221 is formed between two adjacent circles of waterproof raised rings 4222. Correspondingly, a surface of the rigid bracket 421 attached to the flexible bracket 422 is also provided with a structure matched with the annular recessed groove 4221 and the waterproof raised ring 4222. That is to say, a position on the rigid bracket 421 corresponding to the waterproof raised ring 4222 on the flexible bracket 422 is provided with an annular groove for accommodating the waterproof raised ring 4222 to be matched and inserted, and a position on the rigid bracket 421 corresponding to the annular recessed groove 4221 in the flexible bracket 422 is provided with an annular raised structure that may be matched and inserted into the annular recessed groove 4221. In this way, a tight connection between the rigid bracket 421 and the flexible bracket 422, which are nested with each other, may be achieved, and sealant may also be arranged in the annular recessed groove 4221 to enhance the sealing and waterproofing effect between the two to a certain extent.

On this basis, the flexible bracket 422 is also provided with a plurality of limiting columns 4223 around the key column 41. Correspondingly, the rigid bracket 421 is provided with limiting holes 4212 corresponding to positions of the limiting columns 4223. The limiting columns 4223 are respectively inserted into the corresponding limiting holes 4212, thereby strengthening the fixed connection between the rigid bracket 421 and the flexible bracket 422. When the key column 41 is pressed and the annular rubber 45 is deformed, the limiting holes 4212 and the limiting columns 4223 may provide a strong binding force to prevent the deformation from being transmitted to the waterproof raised ring 4222 and affecting the waterproof performance of the waterproof key.

In addition, in another optional embodiment of the disclosure, the smart swimming goggles further include a key cover 44 attached to an end of the key column 41 away from the key bracket 42. A length dimension and a width dimension of the key cover 44 are both greater than a diameter of the key column 41. Therefore, the problem that a user is inconvenient to press due to the small size of the key column 41 is avoided to a certain extent.

Based on the above discussion, in another optional embodiment of the disclosure, the following may further be included.

The light source device has a first projection mode and a second projection mode, and the light source device is inverted vertically according to the projection picture formed by the projection light output in the first projection mode and the projection picture formed by the projection light output in the second projection mode.

The smart swimming goggles include a first wearing mode and a second wearing mode. The waveguide lens 31 when the smart swimming goggles are worn in the first wearing mode has a rotation of 180 degrees relative to the waveguide lens 31 when the smart swimming goggles are worn in the second wearing mode.

When the smart swimming goggles are worn in the first wearing mode, the light source device outputs the projection light in the first projection mode. When the smart swimming goggles are worn in the second wearing mode, the light source device outputs the projection light in the second projection mode.

For a conventional display device with a near-eye display function, no matter the display device is actually applied as a head-mounted device similar to a helmet structure or a specific product such as glasses, there is only one wearing mode The difference is that the smart swimming goggles in the disclosure have two different wearing modes: the first wearing mode and the second wearing mode. The waveguide lens 31 when the smart swimming goggles are worn in the first wearing mode has a rotation of 180 degrees relative to the waveguide lens 31 when the smart swimming goggles are worn in the second wearing mode.

Referring to FIG. 1, in the embodiment shown in FIG. 1, only the swimming goggle eyecup 1 on one side is provided with the near-eye display system 3. Therefore, assuming that what is shown in FIG. 1 is a state when the smart swimming goggles are worn in the first wearing mode, it is apparent that the near-eye display system 3 corresponds to the right eye of the wearer, and the left eye of the wearer cannot see the projection picture. However, when the smart swimming goggles are worn in the second wearing mode, that is, the smart swimming goggles are turned 180 degrees for wearing, at this time, the near-eye display system 3 corresponds to the left eye of the wearer, and the right eye of the wearer no longer receives the projection light. In addition, the waveguide lens 31 corresponding to the second wearing mode is inverted vertically and horizontally relative to the state in the first wearing mode. As shown in FIG. 12, FIG. 12 is a schematic diagram of a display comparison of corresponding projection pictures of smart swimming goggles in two different wearing modes when a projection mode is not switched.

Of course, the smart swimming goggles in the above embodiments only involve the arrangement of the near-eye display system 3 on the eye on one side. It is to be understood that the eyes on both sides may also be respectively provided with the corresponding near-eye display system 3. When the smart swimming goggles are switched between the first wearing mode and the second wearing mode, the waveguide lenses 31 respectively corresponding to the two near-eye d display systems 3 may both be inverted and switched vertically and horizontally. In addition, in the smart swimming goggles, the left eye and the right eye may share a group of near-eye display systems 3, and when the smart swimming goggles are switched between the first wearing mode and the second wearing mode, the waveguide lenses 31 is also inverted vertically and horizontally.

As mentioned above, for the first wearing mode and the second wearing mode of the smart swimming goggles, the state of the waveguide lens 31 has a rotation of 180 degrees, that is, the waveguide lens 31 is inverted vertically and horizontally. Therefore, in order to adapt to the change in the state of the waveguide lens 31 in the embodiment, the corresponding light source device also has two different projection modes respectively.

Taking FIG. 1 as an example, when the smart swimming goggles are worn in the first wearing mode, the light source device projects and outputs the projection light to the waveguide lens 31 in the first projection mode. The projection pictures formed by the projection light are all projection pictures displayed in a forward direction. When the smart swimming goggles are worn in the second wearing mode, because the waveguide lens 31 and the light source device as a whole are turned vertically and horizontally by 180 degrees, if the light source device still outputs the projection light to the waveguide lens 31 in the first projection mode at this time, the projection picture formed by the projection light received by the human eye is obviously a vertically inverted projection picture. Therefore, when the smart swimming goggles are worn in the second wearing mode, the light source device displays and outputs the projection light to the waveguide lens 31 in the second projection mode, thereby ensuring that the smart swimming goggles may display the projection picture in the forward direction for the wearer whether the smart swimming goggles are worn in the first wearing mode or the second wearing mode.

It is to be understood that the light source device may output the projection light in the first projection mode and the second projection mode respectively, which may be achieved by changing the projection light output by the light source device itself. The processor may control the vertically inverted switching of the projection picture output by the image source 30 in the light source device. For the image source 30 in the conventional light source device, the brightness and color of the projection light output by each pixel point on a light-emitting surface thereof may obviously be arranged and changed according to the projection picture that actually needs to be displayed, thereby achieving the projection display of the dynamic projection picture. For the light source device, the switching implementation between the first projection mode and the second projection mode may be regarded as equivalent to the dynamic switching of the two different projection pictures by the image source 30. Therefore, in practical disclosure, the processor may control the image source 30 to display the projection light according to the mode in which the smart swimming goggles are actually worn, and switch the display according to two different projection modes. The main function of the processor is to trigger the switching of the two different projection modes of the image source 30. It can be seen that the processor in the embodiment does not have any procedural improvements and meets the protection object of the disclosure. As for the image source 30, in the embodiment, the image source 30 itself may achieve the projection function of the dynamic projection picture, so as to achieve the display of two mutually inverted projection pictures.

In addition, as mentioned above, the smart swimming goggles may be configured with the sensors such as the three-dimensional acceleration sensor and the gyroscope. Therefore, in practical disclosure, the above sensors may be used to detect the wearing mode of the smart swimming goggles to determine the mode of outputting the projection light by the light source device.

On this basis, after the wearer wears the smart swimming goggles, the wearer may decide whether to switch the projection mode according to the projection picture viewed by the wearer. Specifically, the switching may be triggered by the external terminal device such as the mobile phone or by pressing the waterproof key 4, which is not specifically limited in the disclosure.

Figure 13:
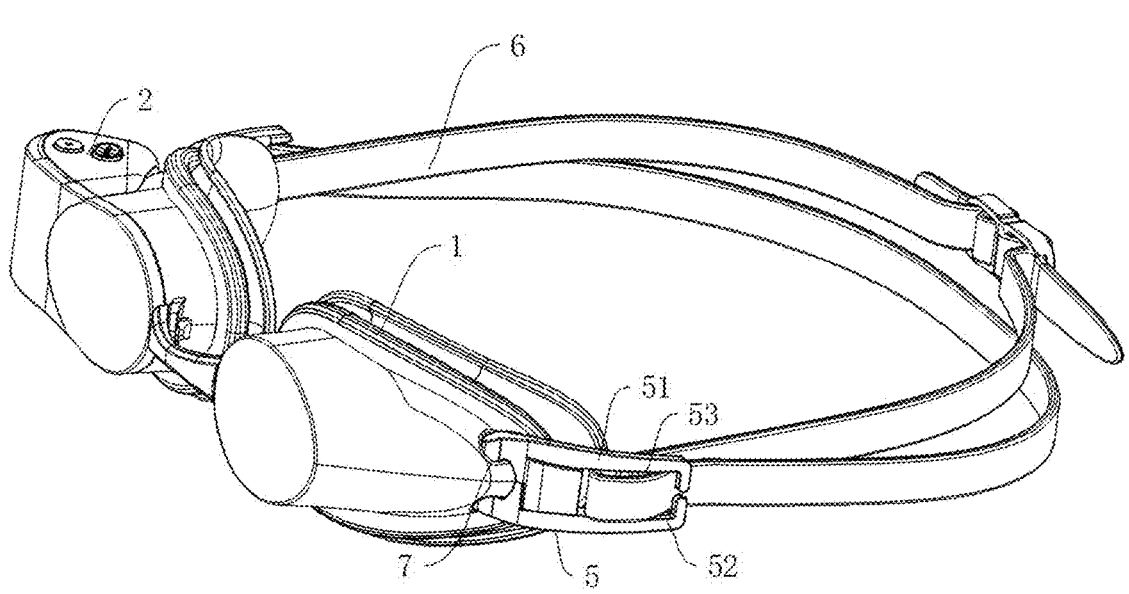
FIG. 13 is a schematic diagram of a side buckle structure provided by an embodiment of the disclosure.
Figure 14:
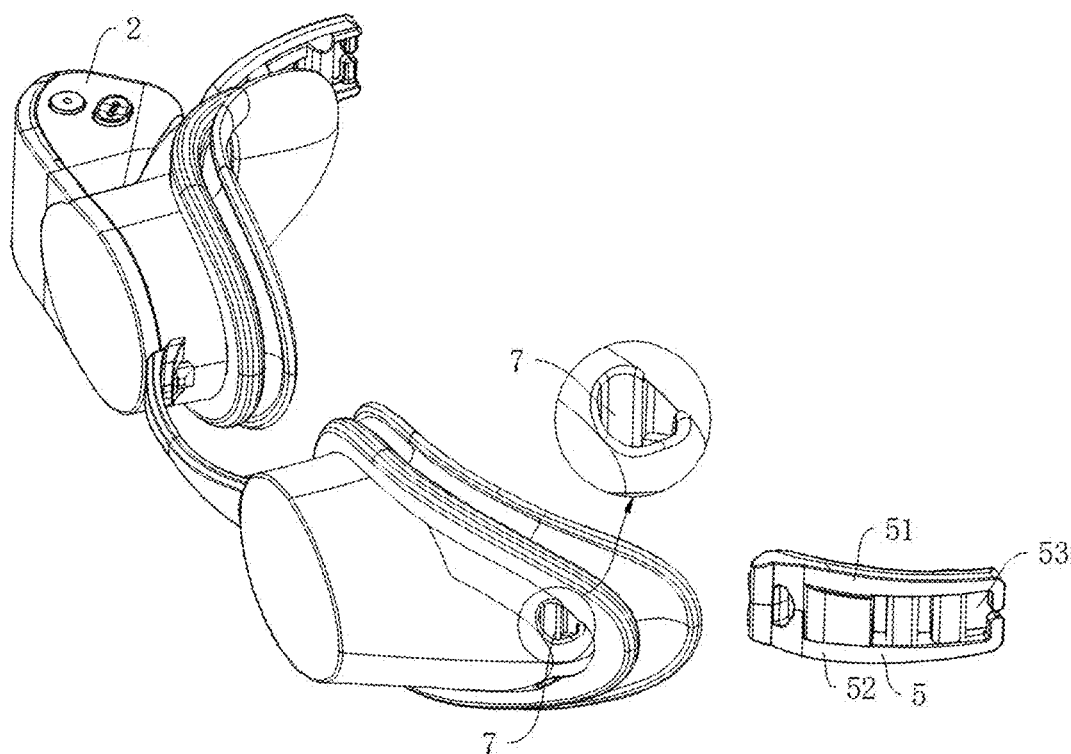
FIG. 14 is another schematic diagram of a side buckle structure provided by an embodiment of the disclosure.
Figure 15:
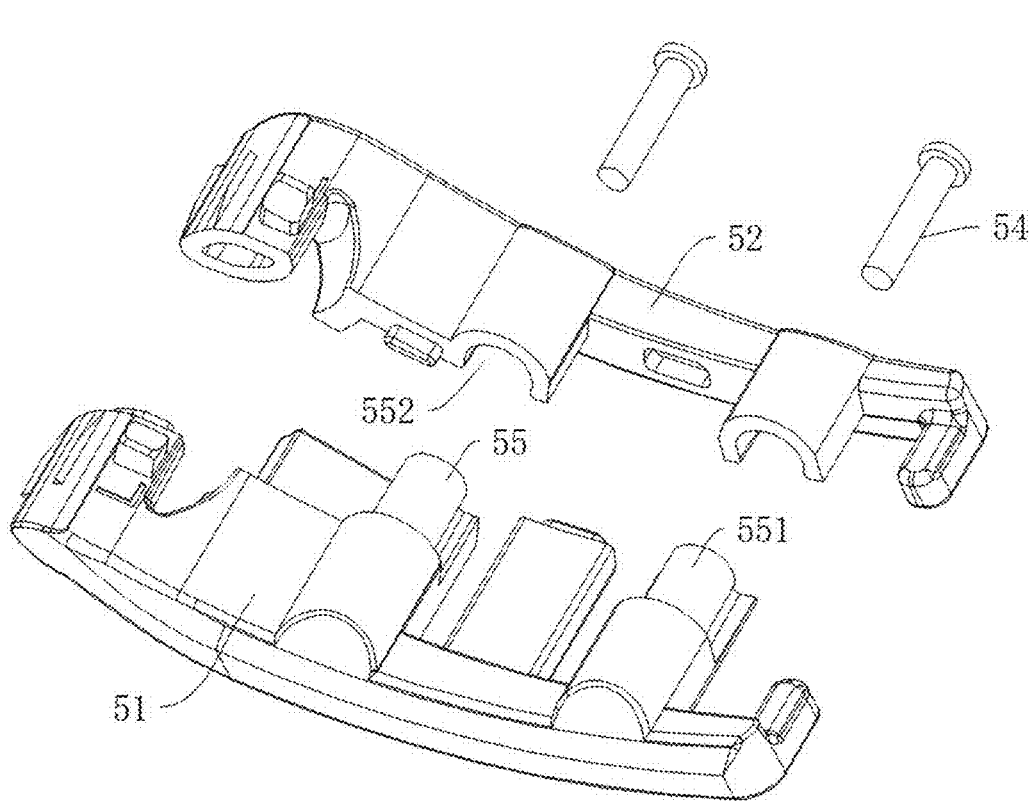
FIG. 15 is an exploded view of a side buckle structure provided by an embodiment of the disclosure.

In addition, as shown in FIG. 13 to FIG. 15, the smart swimming goggles of the disclosure further include a side buckle structure 5, configured to connect a headstrap 6 with the housing 2. The housing 2 has a mounting portion 7. The side buckle structure 5 includes a first connecting piece 51 and a second connecting piece 52, so that the side buckle structure 5 is attached to the housing 2, and at least one threading hole 53 for connecting the headstrap 6 is formed between the first connecting piece 51 and the second connecting piece 52.

Further, the side buckle structure 5 further includes a fixing piece 54, which may fix the first connecting piece 51 to the second connecting piece 52; and a clamping assembly 55, which clamps the first connecting piece 51 to the second connecting piece 52. Specifically, the first connecting piece 51 and the second connecting piece 52 are pre-fixed by the clamping assembly 55, and then the first connecting piece 51 is fixed to the second connecting piece 52 by the fixing piece 54. The clamping assembly 55 includes a clamping block 551 and a clamping groove 552 matched with the clamping block 551. One of the clamping block 551 and the clamping groove 552 is arranged on the first connecting piece 51, and the other is arranged on the second connecting piece 52.

It is apparent that the described embodiments are only a part of the embodiments of the disclosure, and not all of them. All other embodiments obtained by those of ordinary skill in the art on the basis of the embodiments in the disclosure without creative work shall fall within the scope of protection of the disclosure.

It is to be noted that terms used herein are only for the purpose of describing the specific implementations and not intended to limit exemplary implementations of the disclosure. As used herein, the singular form is also intended to include the plural form unless otherwise expressly stated in the context, and it should also be understood that when the terms "contain" and/or "include" are used in the specification, they indicate the presence of features, steps, operations, devices, components and/or combinations thereof.

It is to be noted that the terms "first", "second" and the like in the specification, claims and the above drawings of the disclosure are used for distinguishing similar objects rather than describing a specific sequence or a precedence order. It should be understood that the data used in such a way may be exchanged where appropriate, in order that the implementations of the disclosure described here may be implemented in an order other than those illustrated or described herein.

The above is only the preferred embodiments of the disclosure, and is not intended to limit the disclosure, and for those of ordinary skill in the art, various modifications and changes may be made to the disclosure. Any modifications, equivalent substitutions, improvements, etc. within the spirit and scope of the disclosure shall be included in the scope of protection of the disclosure.

The invention claimed is:

1. A smart swimming goggles, comprising a swimming goggle eyecup, a housing attached to the swimming goggle eyecup and internally provided with a closed cavity, and a near-eye display system arranged in the closed cavity of the housing, wherein the near-eye display system comprises a light source device configured to output projection light, an optical assembly at least comprising a waveguide lens, a processor electrically attached to the light source device, and a wireless communication module in communication connection with the processor;

wherein the optical assembly is configured to transmit the projection light outputted by the light source device to a human eye through the waveguide lens; an area, right facing the waveguide lens, of the housing is a light-transmitting area, so that the human eye is able to see an environmental scenery and a projection picture through the light-transmitting area;

the processor is in communication connection with an external terminal device through the wireless communication module, so that information interaction between the processor and the external terminal device is facilitated; and the housing is further provided with a waterproof key attached to the processor and configured to send a trigger instruction to the processor when pressed, so that the processor controls a working state of the light source device according to the trigger instruction;

the light source device has a first projection mode and a second projection mode, and the light source device is inverted vertically according to the projection picture formed by the projection light output in the first projection mode and the projection picture formed by the projection light output in the second projection mode;

the smart swimming goggles comprise a first wearing mode and a second wearing mode, wherein the waveguide lens when the smart swimming goggles are worn in the first wearing mode has a rotation of 180 degrees relative to the waveguide lens when the smart swimming goggles are worn in the second wearing mode;

when the smart swimming goggles are worn in the first wearing mode, the light source device outputs the projection light in the first projection mode; and when the smart swimming goggles are worn in the second wearing mode, the light source device outputs the projection light in the second projection mode.

2. The smart swimming goggles according to claim 1, wherein the waveguide lens comprises a coupling-in surface, a side surface, and a coupling-out surface, wherein the coupling-out surface is obliquely arranged relative to the side surface; the coupling-out surface is provided with a diffraction element;

the projection light output by the light source device is coupled into the waveguide lens through the coupling-in surface, is incident to the coupling-out surface after total reflection and conduction of the side surface, and is diffracted and output to the human eye through the diffraction element; and the optical assembly further comprises a compensation lens attached to a side of the diffraction element away from the coupling-out surface and configured to perform distortion correction on ambient light which passes through the compensation lens, the diffraction element, and the waveguide lens sequentially.

3. The smart swimming goggles according to claim 1, wherein the optical assembly further comprises an optical correction lens arranged on a side of the waveguide lens.

4. The smart swimming goggles according to claim 1, wherein a surface of the light-transmitting area of the housing close to a side of the swimming goggle eyecup is provided with a functional film, wherein the functional film comprises a substrate layer, and at least one structural layer of a reinforcing layer, an anti-fog layer, and an anti-blue light layer arranged on the substrate layer.

5. The smart swimming goggles according to claim 1, wherein the smart swimming goggles comprises a data detector attached to the processor, wherein the data detector comprises at least one of an acceleration sensor, a gyroscope, a geomagnetic sensor, a Global Positioning System (GPS), a water temperature sensor, a water pressure sensor, a heart rate meter, and an oximeter; and the processor is configured to obtain detection data measured by the data detector, perform projection display on the detection data through the light source device, and upload the detection data to the external terminal device.

6. The smart swimming goggles according to claim 1, wherein the light source device comprises an image source configured to output the projection light; the optical assembly further comprises an optical prism arranged on an output light path of the light source device and configured to refract and input the projection light output by the image source into a coupling-in surface;

the near-eye display system further comprises an integrated frame having two mounting plates arranged in parallel; the integrated frame is clamped to an inner wall of the housing;

the image source is mounted on a side of the two mounting plates, and a coupling-in end of the waveguide lens is mounted on the other side of the two mounting plates; the optical prism is mounted between the two mounting plates and is located between the image source and the coupling-in end of the waveguide lens;

wherein the two mounting plates are respectively snap-fitted with the optical prism and the coupling-in end of the waveguide lens through a snap-fit structure.

7. The smart swimming goggles according to claim 1, wherein the housing is provided with a key through hole;

the waterproof key comprises a key column penetrating through the key through hole, a key bracket arranged on an inner side of the housing and elastically attached to the key column, and a circuit board arranged on a side of the key bracket away from the housing; a position, right facing the key column, of the circuit board is provided with a key sensor;

wherein the key bracket and an area around the key through hole on an inner wall of the housing are hermetically connected, so that the key bracket seals and covers an area where the key through hole is located.

8. The smart swimming goggles according to claim 7, wherein the smart swimming goggles comprises a key cover attached to an end of the key column away from the key bracket, wherein a length dimension and a width dimension of the key cover are both greater than a diameter of the key column.

9. The smart swimming goggles according to claim 1, wherein the light source device comprises an image source attached to the processor, wherein the processor is configured to control vertically inverted switching of the projection picture output by the image source.

10. The smart swimming goggles according to claim 2, wherein the housing has a mounting portion, the mounting portion is matched with a side buckle structure to connect a headstrap with the housing, and the side buckle structure comprises a first connecting piece and a second connecting piece which are fixed to each other, so that the side buckle structure is attached to the housing, and at least one threading hole for connecting the headstrap is formed between the first connecting piece and the second connecting piece.

11. The smart swimming goggles according to claim 10, wherein the side buckle structure further comprises:

a fixing piece, configured to fix the first connecting piece to the second connecting piece; and a clamping assembly, by which the first connecting piece and the second connecting piece are clamped;

wherein the first connecting piece and the second connecting piece are pre-fixed by the clamping assembly, and then the first connecting piece is fixed to the second connecting piece by the fixing piece;

wherein the clamping assembly comprises a clamping block and a clamping groove matched with the clamping block, wherein one of the clamping block and the clamping groove is arranged on the first connecting piece, and the other is arranged on the second connecting piece.

12. The smart swimming goggles according to claim 1, wherein the housing comprises a goggle frame and a goggle cover, the goggle frame is of a semi-closed cavity structure having an opening, the goggle cover and the goggle frame jointly form a closed cavity structure; an edge of the opening of the goggle frame is provided with a circle of sealing rib, and the goggle cover is correspondingly provided with a circle of sealing groove, when the sealing rib on the goggle frame is inserted into the sealing groove in the goggle cover, the goggle frame and the goggle cover are attached to each other.

13. The smart swimming goggles according to claim 2, wherein the coupling-in surface of the waveguide lens is an inclined plane or a curved surface that has a certain inclination angle with the side surface of the waveguide lens, the curved surface that has a certain inclination angle with the side surface of the waveguide is equivalent to attaching a lens to the inclined plane that has a certain inclination angle with the side surface of the waveguide lens, one surface of the lens is a flat surface attached to the inclined plane, and the other surface of the lens is a convex curved surface or a concave curved surface.

14. The smart swimming goggles according to claim 4, wherein the substrate layer is a carrier, the substrate layer is an optical-grade Polyethylene Terephthalate substrate layer or a Polycarbonate substrate layer with a thickness of 0.03 mm to 0.20 mm and a light transmittance of greater than 90%.

15. The smart swimming goggles according to claim 4, wherein the reinforcing layer is an Ultraviolet ink layer with a thickness of 0.012 mm to 0.018 mm and a hardness of 1 H to 6 H; and/or the anti-fog layer is a resin anti-fog layer with a thickness of 0.012 mm to 0.018 mm.

16. The smart swimming goggles according to claim 4, wherein a thickness of the anti-blue light layer is 150 nm to 450 nm.

17. The smart swimming goggles according to claim 6, wherein the two mounting plates are respectively provided with a first side plate and a second side plate on both sides in a second direction.

18. The smart swimming goggles according to claim 17, wherein the first side plate is of a planar plate structure, and the first side plate is provided with a through hole, so that the optical prism is inserted from the through hole into a space between the two mounting plates for assembly, the second side plate is of a cylindrical curved structure, and an area of the second side plate is relatively small, so that the first side plate, the second side plate, and the two mounting plates form a larger opening at the end close to the waveguide lens to facilitate the insertion of the coupling-in end of the waveguide lens into the space between the two mounting plates.

19. The smart swimming goggles according to claim 11, wherein the clamping groove comprises a guide groove and a positioning hole, an aperture of the positioning hole is matched with a diameter of the clamping column, a width of an end of the guide groove close to the positioning hole is smaller than the aperture of the positioning hole, and the width of the guide groove decreases from an end away from the positioning hole to the end close to the positioning hole.

* * * * *